United States Patent
Brewer et al.

(10) Patent No.: US 12,481,465 B2
(45) Date of Patent: Nov. 25, 2025

(54) HOST-PREFERRED MEMORY OPERATION

(71) Applicant: Micron Technology, Inc., Boise, ID (US)

(72) Inventors: Tony M. Brewer, Plano, TX (US); Dean E. Walker, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/795,877

(22) Filed: Aug. 6, 2024

(65) Prior Publication Data

US 2024/0393983 A1 Nov. 28, 2024

Related U.S. Application Data

(63) Continuation of application No. 17/823,314, filed on Aug. 30, 2022, now Pat. No. 12,079,516.

(51) Int. Cl.
*G06F 12/00* (2006.01)
*G06F 3/06* (2006.01)
*G06F 9/38* (2018.01)

(52) U.S. Cl.
CPC .......... *G06F 3/0659* (2013.01); *G06F 3/0607* (2013.01); *G06F 9/3877* (2013.01); *G06F 3/0679* (2013.01)

(58) Field of Classification Search
CPC .... G06F 3/0659; G06F 3/0607; G06F 3/0679; G06F 9/3877; G06F 12/084; G06F 12/0842; G06F 12/0844; G06F 13/1606; G06F 13/1673
See application file for complete search history.

(56) References Cited

U.S. PATENT DOCUMENTS

| | | | |
|---|---|---|---|
| 2006/0053257 A1* | 3/2006 | Sistla | G06F 12/084 711/158 |
| 2018/0293113 A1 | 10/2018 | Mukherjee et al. | |
| 2020/0125495 A1 | 4/2020 | Galbi et al. | |
| 2024/0069800 A1 | 2/2024 | Brewer et al. | |

\* cited by examiner

*Primary Examiner* — Shawn X Gu
(74) *Attorney, Agent, or Firm* — Schwegman Lundberg & Woessner, P.A.

(57) ABSTRACT

System and techniques for host-preferred memory operation are described herein. At a memory-side cache of a memory device that includes accelerator hardware, a first memory operation can be received from a host. A determination that the first memory operation corresponds to a cache set based on an address of the first memory operation is made. A second memory operation can be received from the accelerator hardware. Another determination can be made that the second memory operation corresponds to the cache set. Here, the first memory operation can be enqueued in a host queue of the cache set and the second memory operation can be enqueued in an internal request queue of the cache set. The first memory operation and the second memory operation can be executed as each is dequeued.

20 Claims, 8 Drawing Sheets

| | | | |
|---|---|---|---|
| 405 | CACHE SET 0 (ADDRESS 00XXXX) | CACHE LINE | WAY 0 TAG + DATA — 425 |
| | | CACHE LINE | WAY 1 TAG + DATA — 430 |
| | | CACHE LINE | WAY 2 TAG + DATA — 435 |
| | | CACHE LINE | WAY 3 TAG + DATA — 440 |
| 410 | CACHE SET 1 (ADDRESS 01XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |
| 415 | CACHE SET 2 (ADDRESS 10XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |
| 420 | CACHE SET 3 (ADDRESS 11XXXX) | CACHE LINE | WAY 0 TAG + DATA |
| | | CACHE LINE | WAY 1 TAG + DATA |
| | | CACHE LINE | WAY 2 TAG + DATA |
| | | CACHE LINE | WAY 3 TAG + DATA |

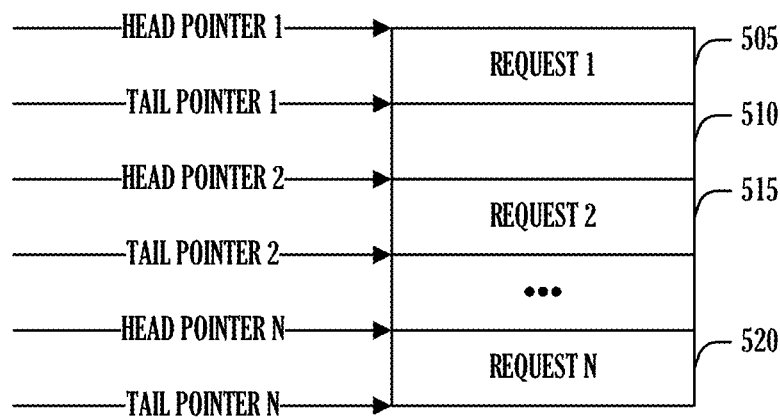
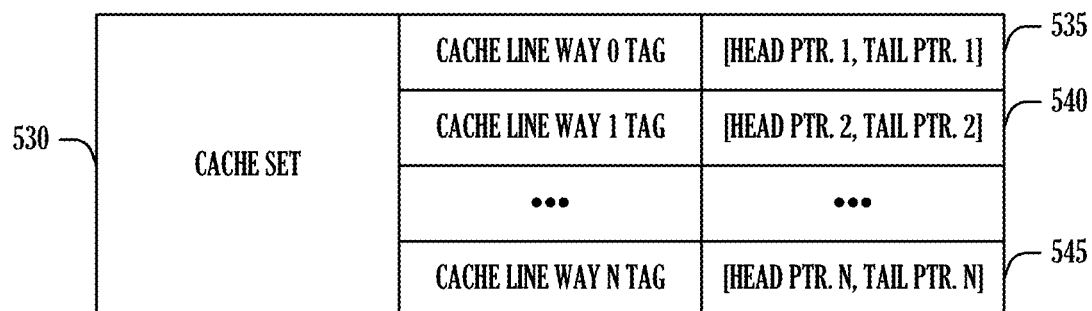
FIG. 5

HOST-PREFERRED MEMORY OPERATION

PRIORITY APPLICATION

This application is a continuation of U.S. application Ser. No. 17/823,314, filed Aug. 30, 2022, which is incorporated herein by reference in its entirety.

STATEMENT REGARDING GOVERNMENT SUPPORT

This invention was made with Government support under Agreement No. DE-NA0003525, awarded by SANDIA II. The Government has certain rights in the invention.

TECHNICAL FIELD

Embodiments described herein generally relate to computer memory and more specifically to host-preferred memory operation.

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 4 illustrates an example of an associative cache, according to an embodiment.

FIG. 5 illustrates an example of a memory including several cache way defer queues and cache tags pointing to the defer queues, according to an embodiment.

DETAILED DESCRIPTION

Figure 1:
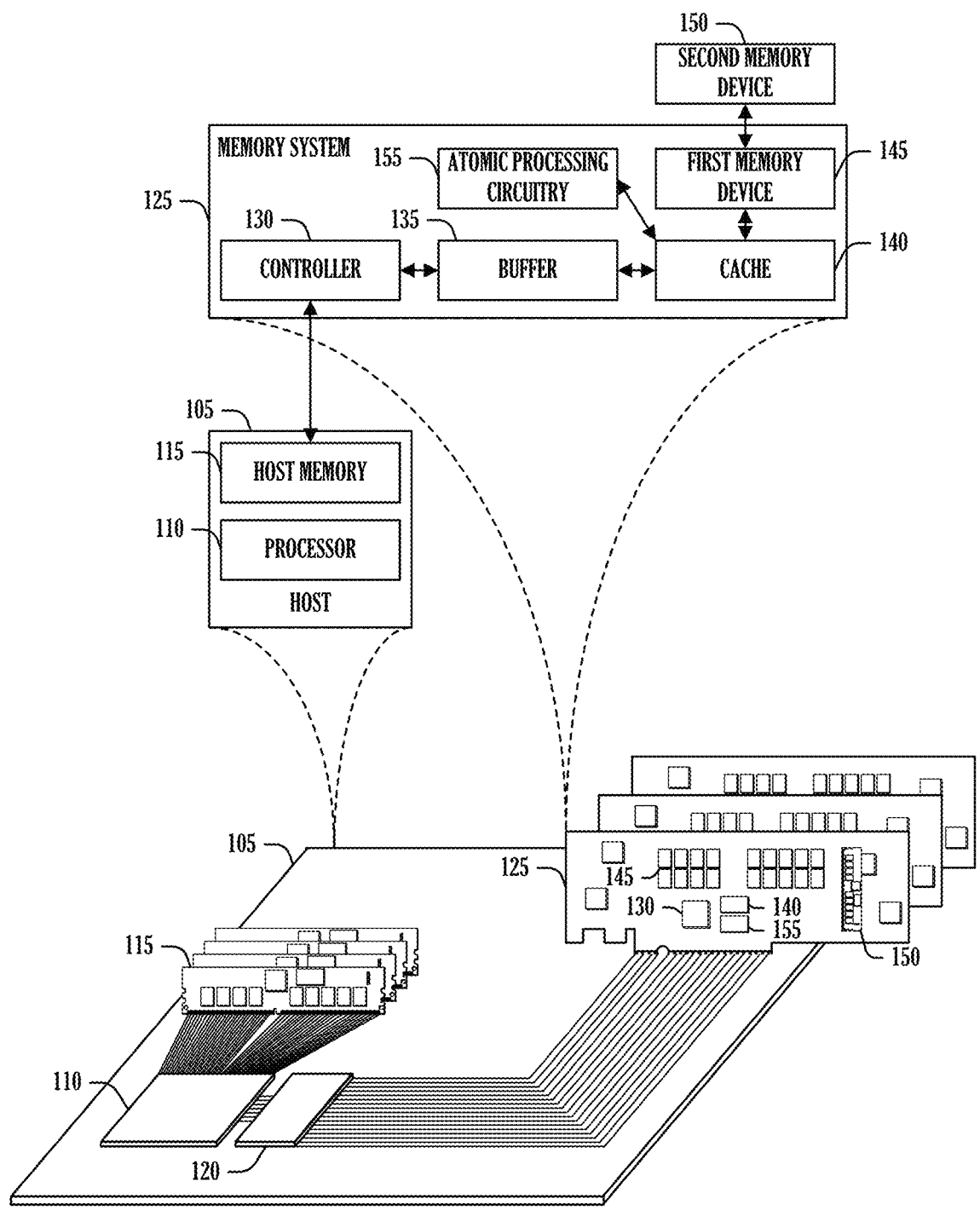
FIG. 1 illustrates an example of an environment including a system for host-preferred memory operation, according to an embodiment.

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCI Express (PCIe)-based I/O semantics for optimized performance.

CXL can be used in applications such as artificial intelligence, machine learning, analytics, cloud infrastructure, edge computing devices, communication systems, and elsewhere, to provide flexible connectivity to memory or accelerators for a host processor platform. Data processing in such applications can use various scalar, vector, matrix, or spatial architectures that can be deployed in CPU, GPU, FPGA, smart NICs, or other accelerators that can be coupled using a CXL link. Near memory accelerators, in which an accelerator is collocated with memory, provide low latency processing while expanding system capabilities.

CXL supports dynamic multiplexing using a set of protocols that includes I/O (CXL.io, based on PCIe), caching (CXL.cache), and memory (CXL.memory) semantics. In an example, CXL can be used to maintain a unified, coherent memory space (e.g., cache coherence) between the CPU (e.g., a host device or host processor) and any memory managed (e.g., at) the CXL device. This configuration enables the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL devices that include both memory and an accelerator can be termed "CXL type-2" devices. Although the accelerators of such devices can be used by themselves through the CXL interface, often these accelerators provide near-memory compute to reduce round-trip latency to a host processor. In accordance with current CXL standards, CXL memory requests (e.g., external requests) take priority over other requests, such as network-on-chip (NOC) or other internal requests. This priority requires CXL memory requests to make forward progress independent of any other device activity, such as activity by an accelerator. That is, a CXL memory request cannot block indefinitely waiting for a non-CXL memory request to complete. Separately managing memory controller workflow with this restriction when both CXL and non-CXL requests are being made can be a complex process.

To address the complexity between CXL (or other external) requests and accelerator (or other internal requests), separate processing queues are maintained for deferred requests. Requests that are not deferred proceed as soon as they arrive in the memory controller because there is no resource contention. Thus, in these cases, there is no opportunity, for example, for an internal request to block the progress of an external request. However, when resource contention is present, the request will be deferred until the contention is resolved. An elegant solution to managing the different processing priorities of external and internal requests includes queuing each in separate deferral queues, whereby priority of the external requests can be easily maintained by prioritizing extraction of requests from the external queue. Moreover, order of operations on a memory address can be maintained by judicious selection of requests from the external and internal queues all while preventing an internal request from blocking (e.g., preventing forward progress on) an external request. Additional details and examples are provided below.

FIG. 1 illustrates an example of an environment including a system for host-preferred memory operation, according to an embodiment. The system includes a host device 105 and a memory system 125. The host device 105 includes processor 110 (e.g., a central processing unit (CPU)) and host memory 115. In an example, the host device 105 is, or is part of, a host system such as a server computer, workstation, personal laptop computer, a desktop computer, a digital camera, a smart phone, a memory card reader, or Internet-of-thing enabled device, among others. The processor 110 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system includes a second memory device 150 that interfaces with the memory system 125 and the host device 105.

The host device 105 can include a system backplane and can include a number of processing resources (e.g., one or more processors, microprocessors, or some other type of controlling circuitry). The system can optionally include separate integrated circuits for the host device 105, the memory system 125, the controller 130, the buffer 135, the cache 140, the first memory device 145, the second memory device 150, any one or more of which can comprise respective chiplets that can be connected and used together. In an example, the system includes a server system or a high-performance computing (HPC) system or a portion thereof. Embodiments of the host device 105 can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system, or the first memory device 145 can comprise accessory memory or storage for use by the system. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, ReRAM, FeRAM, MRAM, PCM). Some memory devices—such as a ferroelectric RAM (FeRAM) devices that include ferroelectric capacitors—can exhibit hysteresis characteristics, such as a 3-D Crosspoint (3D XP) memory device, or combinations thereof.

In an example, the interface 120 can include any type of communication path, bus, interconnect, or the like, that enables information to be transferred between the processor 110, or other devices of the host device 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the processor 110) and memory on attached devices or accelerators (e.g., the first memory device 145 or the second memory device 150). This arrangement enables resource sharing at higher performance, reduced software stack complexity, and lower overall system cost than other interconnect arrangements. CXL is an industry open standard interface for high-speed communications to accelerators that are increasingly used to complement CPUs in support of emerging data-rich and compute-intensive applications such as artificial intelligence and machine learning. The memory system 125 is illustrated with atomic processing circuitry 155 as an accelerator in order to perform near-memory operations. In general, the atomic memory operations (AMOs) performed by the atomic processing circuitry 155 include such small operations as incrementing a number at a memory address or multiply number in two memory addresses, etc. While AMOs are generally used for such operations, the manipulation of memory is not so restricted. For example, modern artificial neural network architectures generally involves the application of small additive or multiplicative operations or thresholding across vast swaths of artificial neurons. Because the computations are usually simple, but the data large, near memory execution of such operations is possible and beneficial given the illustrated architecture.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the processor 110 or the controller 130 comprises a command manager (CM) for the memory system 125. The CM can receive, such as from the host device 105, a read command for a particular logic row address in the first memory device 145 or the second memory device 150. In an example, the CM can determine that the logical row address is associated with a first row based at least in part on a pointer stored in a register of the controller 130. In an example, the CM can receive, from the host device 105, a write command for a logical row address, and the write command can be associated with second data. In an example, the CM can be configured to issue, to non-volatile memory and between issuing the read command and the write command, an access command associated with the first memory device 145 or the second memory device 150. In an example, the CM can issue, to the non-volatile memory and between issuing the read command and the write command, an access command associated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache provides faster access to data than the backing memories. The cache 140 can include a pool of data entries. In an example, the cache 140 can be configured to operate according to a write-back policy in which data is written to the cache without the being concurrently written to the first memory device 145. Accordingly, in some embodiments, data written to the cache 140 does not have a corresponding data entry in the first memory device 145. This can occur when, for example, data is written to the cache and deleted before a write-back is triggered to write the data into the first memory device 145, for example.

In an example, the cache 140 is implemented as a multi-way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 4 illustrates some elements of this type of associate cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the host device 105 via the interface 120. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the processor 110. Working exclusively through the cache can simplify some elements of the controller 130 hardware at the cost of a little latency.

A host-preferred memory operation is one in which the host requests (e.g., CXL memory requests, external requests, etc.) are given priority over those of the memory controller itself, such as internal requests received from an accelerator. As noted above, a technique to implement host-preferred memory operations involves maintaining separate external request queues and internal request queues. Prioritization is given to the external request queue without complicated operation interference or priority logic. To implement such a technique, the memory controller 130 is configured to receive a first memory operation. In an example, the first memory operation is received at a memory-side cache, such as the cache 140. In this example, the cache 140 includes circuitry to configured to implement the host-preferred memory operation. However, for the sake of simplicity, the following examples are provided from the perspective of the memory controller 130.

The first memory operation is received from the host processor 110 or other external entity. Accordingly, the first memory operation is an external request. In an example, the interface 120 connecting the host processor 110 to the memory system 125 is a CXL interlink. In an example, memory operations from the host processor 110 to the memory system 125 are CXL memory operations.

The controller 130 is configured to select a cache set based on the address in the memory address. Here, the cache 140 is an n-way associative cache, such as that illustrated in FIG. 4. The association of the address to a given cache set is generally fixed.

The controller 130 is configured to receive a second memory operation from accelerator hardware—such as the atomic processing circuitry 155—of the memory system 125. Thus, the second memory operation is an internal request that cannot hold up forward progress on the external request that is the first memory operation in accordance with the CXL protocol.

The controller 130 is configured to determine that the second memory operation also corresponds to the cache set to which the first memory operation mapped. At this juncture, both the first memory request and the second memory request refer to the same address. Thus, there is contention on a cache line, or way, to which the address will be associated. However, there can be other contention elements, such as the absence of a free way to load the address or other requests currently running against a way with the address.

Figure 3:
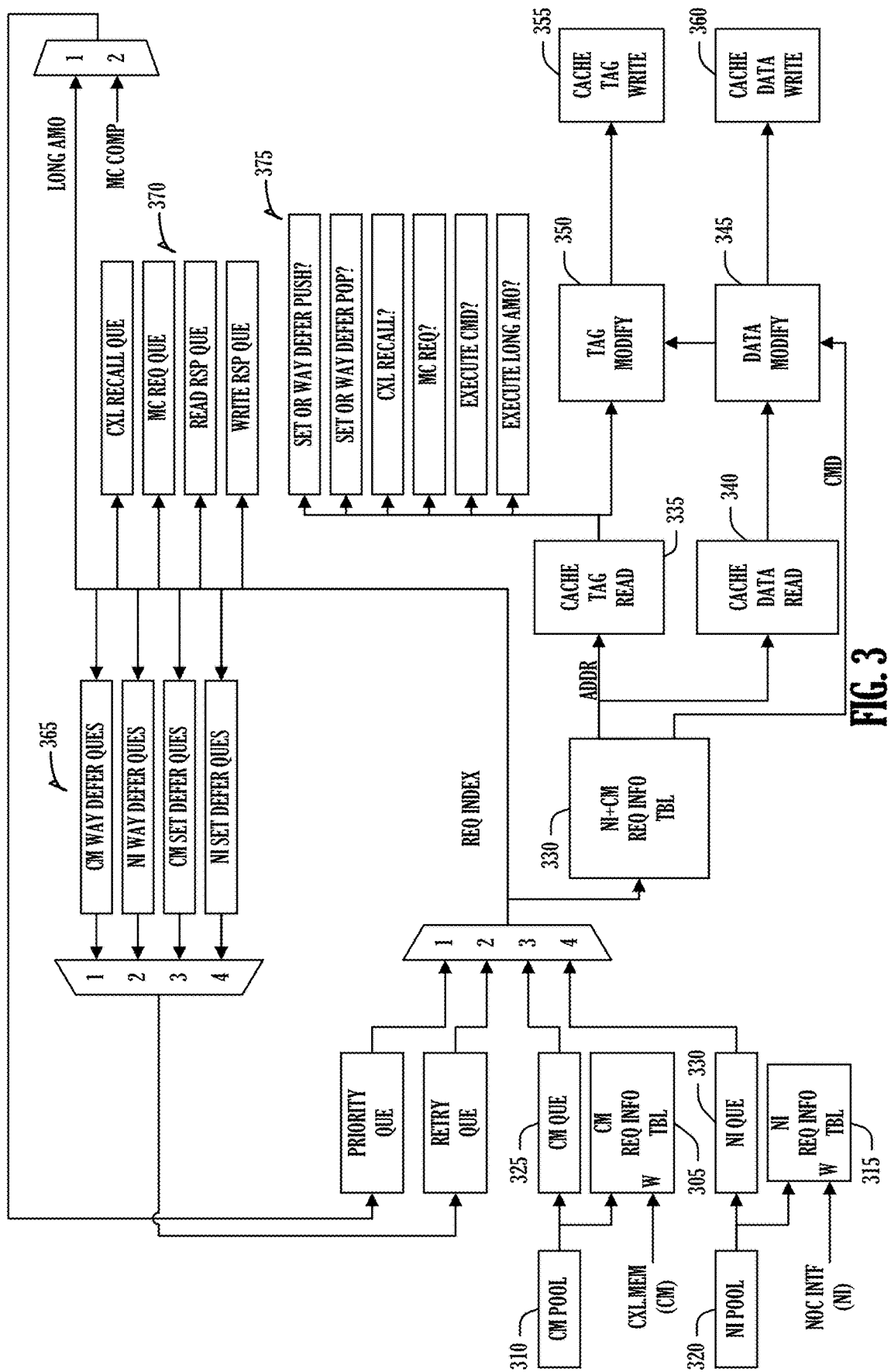
FIG. 3 illustrates example components of a memory device, according to an embodiment.
Figure 6:
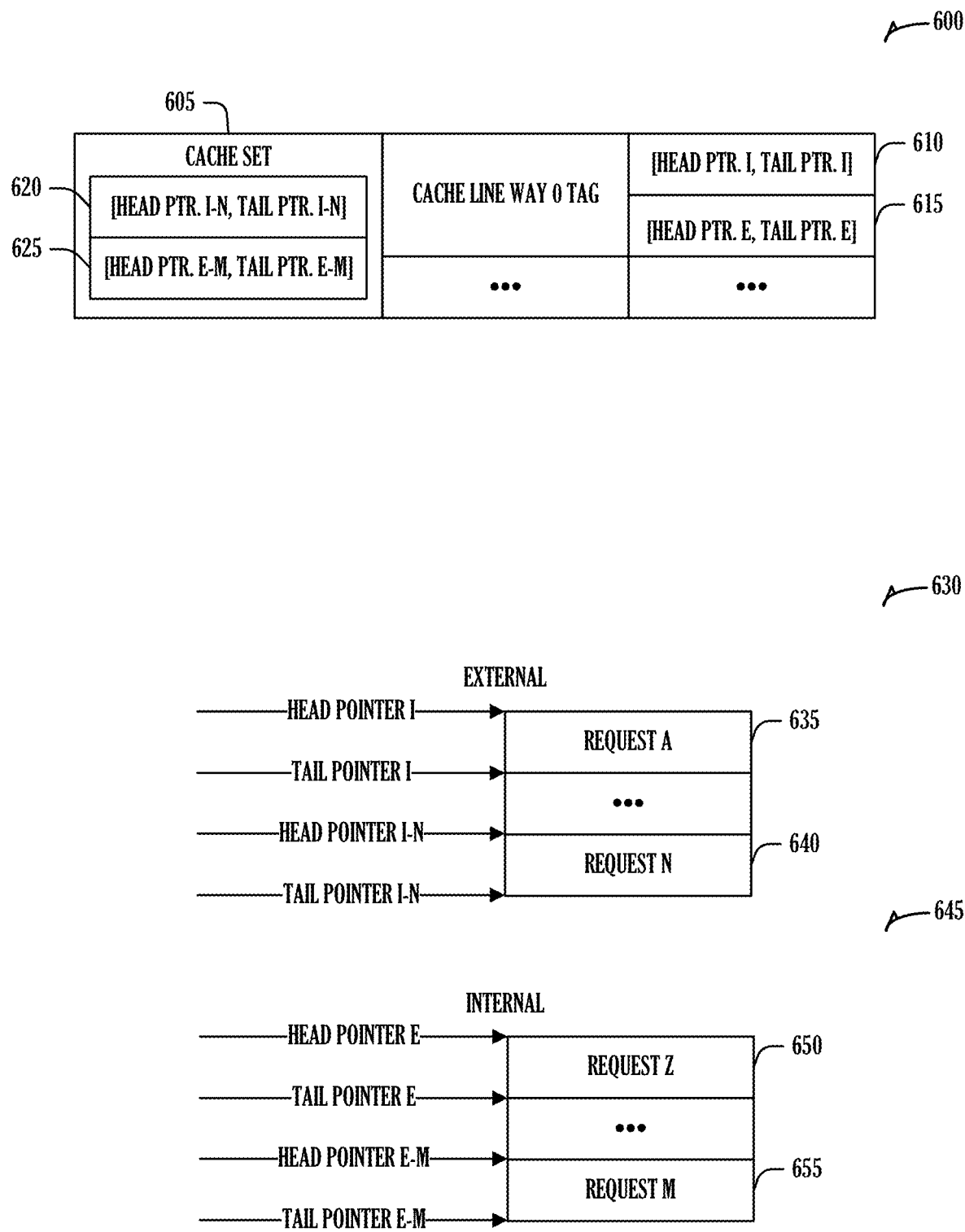
FIG. 6 illustrates an example of a cache set reference to cache-set defer queues divided by which interface requests were received, according to an embodiment.

The controller 130 is configured to enqueue (e.g., push onto a queue) the first memory operation in a host queue of the cache set. Here, the host queue can be exclusive to a way in the cache set, or not associated with any given way of the cache set. In the latter case, the host queue can be said to be general to the cache set, or a general host queue for the cache set. In an example, the host queue is referred to as an external queue. In an example, the host queue is implemented as a linked list (e.g., as illustrated in FIG. 5 or FIG. 6) in management memory of the memory-side cache 140. In an example, the management memory is different than backing memory for cache lines of the memory device. This last example specifies that the queues are separate from the cache tag and data storage. An example is illustrated in FIG. 3. Although the queues can be implemented as registers, volatile RAM, or non-volatile memory, among other types of memory devices, the queues remain distinct from the cache way tag and way data storage device.

The controller 130 is configured to enqueue the second memory operation in an internal request queue of the cache set. Again, the internal request queue can be general to the cache set (e.g., not associated with any particular way of the cache set) or specific to a way in the cache set. In an example, similar to the host queue above, the internal request queue is implemented as a linked list in management memory of the memory-side cache. Again, in an example, the management memory is different than backing memory for cache lines of the memory device.

In an example, both the first memory operation and the second memory operation correspond to a cache way (e.g., cache line) of the cache set. Thus, in this example, the cache set has a way that already corresponds to the address in both the first and second memory operation. Accordingly, there is no need to defer to evict a current occupant of the way. However, there can be other memory requests waiting to manipulate the data at the way. Thus, the first and second memory requests are enqueued. In an example, the host queue and the internal request queue correspond to the cache way. Here, the way has its own, distinct internal and host queue pair. In an example, each cache way of the cache set includes a separate host queue and internal request queue. This example illustrates that the host queue and internal queue separation is replicated at the ways of the cache set as well as in the general cache set. FIG. 6 provides an illustration of this arrangement.

In an example, neither the first memory operation nor the second memory operation correspond to a cache way of the cache set. In this example, a way will need to be evicted before the address can be associated to the way. Because there can be processing remaining on the present way, placing the first or second request into the internal or host queue of the present way would not make sense. Thus, in an example, the host queue and the internal request queue are deferred queues of the cache set, or general internal and host queues of the cache set. FIG. 6 also illustrates this arrangement. In an example, the cache set has exactly one deferred host queue and exactly one deferred internal request queue that are not associated with a particular cache line of the cache set. This last example provides an implementation in which the complexity of general cache set level queues is limited to a single general host queue and a single internal queue.

The controller 130 is configured to execute the first memory operation and the second memory operation as each is dequeued. Here, the dequeuing of a request resolves the contention issue. That is, when the contention for a way is resolved (e.g., a previous request completes), the next request is dequeued. In general, requests deferred on a current way are dequeued and completed before the way is evicted. During this period, host queue requests are generally dequeued until empty before internal requests are dequeued. However, other prioritization mechanisms can be used, such as dequeuing host requests at a higher rate (e.g., two host requests for each internal request) or the like.

Requests on the general host queue or the general internal queue track how a way should be configured once pending requests on the way complete. Thus, the top general host queue request establishes the address of the way once the current association to the way is evicted. In any case, the maintenance of the host and the internal queues at each of these processing points enables an elegant management technique to ensure varied prioritization or other restrictions imposed upon the memory system depending upon where a request originated.

Figure 2:
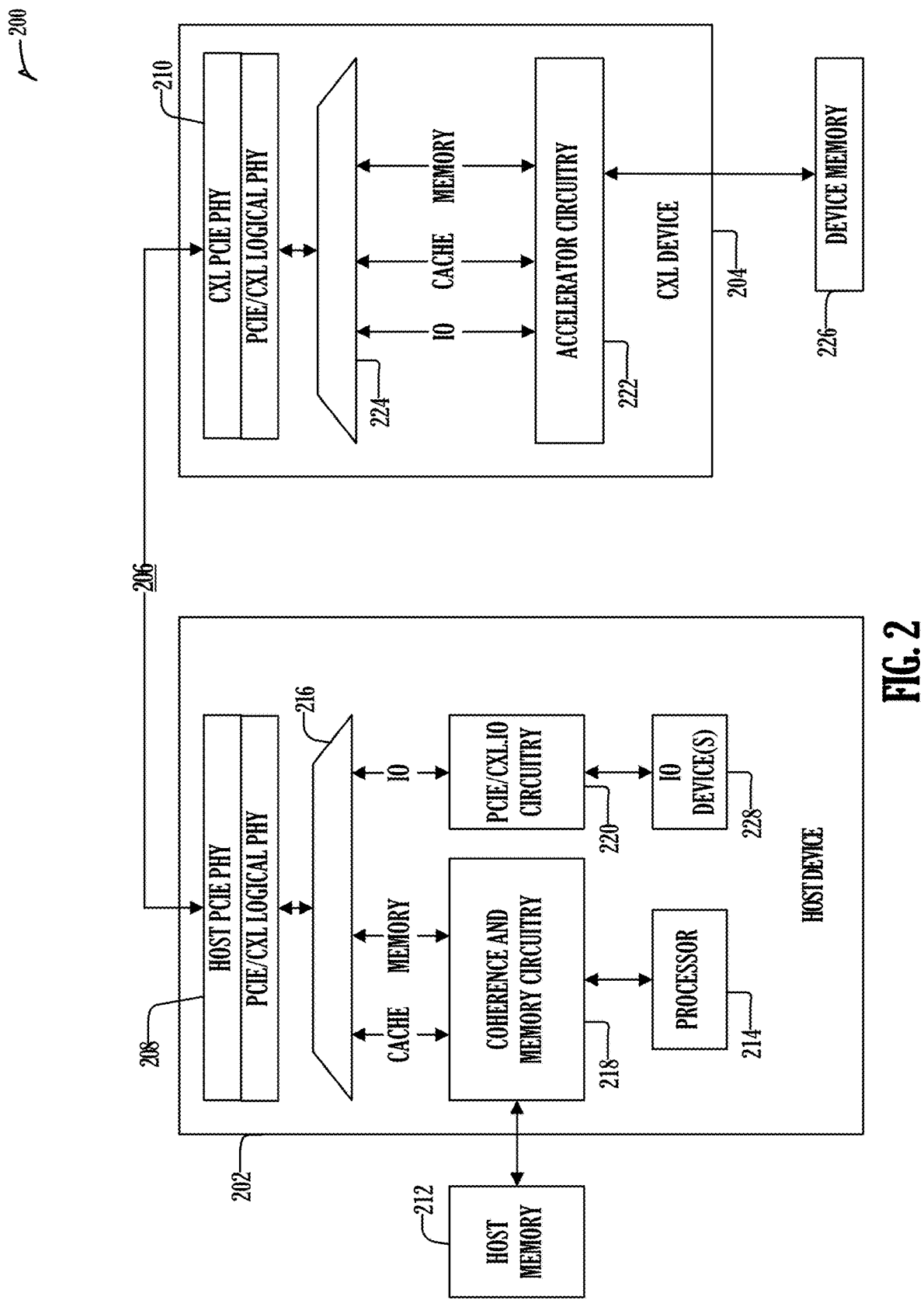
FIG. 2 illustrates an example of a host connected to a CXL device, according to an embodiment.

FIG. 2 illustrates an example of a host connected to a CXL device, according to an embodiment. FIG. 2 illustrates generally an example of a CXL system 200 that uses a CXL link 206 to connect a host device 202 and a CXL device 204 via a host physical layer PCIE interface 208 and a CXL client physical layer PCIE interface 210 respectively. In an example, the host device 202 comprises or corresponds to the host device 105 and the CXL device 204 comprises or corresponds to the memory system 125 from the example of the system in FIG. 1. A memory system command manager can comprise a portion of the host device 202 or the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and IO device(s) 228. The host device 202 can comprise, or can be coupled to, host memory 212. The host device 202 can include various circuitry (e.g., logic) configured to facilitate CXL-based communications and transactions with the CXL device 204. For example, the host device 202 can include coherence and memory circuitry 218 configured to implement transactions according to CXL.cache and CXL.mem semantics, and the host device 202 can include PCIe circuitry 220 configured to implement transactions according to CXL.io semantics. In an example, the host device 202 can be configured to manage coherency of data cached at the CXL device 204 using, e.g., its coherence and memory circuitry 218.

The host device 202 can further include a host multiplexer 216 configured to modulate communications over the CXL link 206 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 202, such as using the coherence and memory circuitry 218.

The CXL device 204 can include an accelerator device that comprises various accelerator circuitry 222. In an example, the CXL device 204 can comprise, or can be coupled to, CXL device memory 226. The CXL device 204 can include various circuitry configured to facilitate CXL-based communications and transactions with the host device 202 using the CXL link 206. For example, the accelerator circuitry 222 can be configured to implement transactions according to CXL.cache, CXL.mem, and CXL.io semantics. The CXL device 204 can include a CXL device multiplexer 224 configured to control communications over the CXL link 206. The accelerator circuitry 222 can be one or more processors that can perform one or more tasks. Accelerator circuitry 222 can be a general purpose processor or a processor designed to accelerate one or more specific workloads.

FIG. 3 illustrates example components of a memory device, according to an embodiment. The illustrated components are part of a memory controller, such as those described above (e.g., the memory controller 130 illustrated in FIG. 1) implementing a memory-side cache (MSC). The illustrated components include elements to address internal (e.g., from a near-memory accelerator) and external (e.g., received from a host via a CXL link) request differences used to maintain CXL protocol requirements, such as maintaining forward progress of CXL memory (CM) requests.

As illustrated, CM refers to CXL memory or other external requests and NI refers to requests coming from a NOC interface or other internal requests. Requests from CXL.mem are written to the CM Request Information Table 305. The entry in the CM Request Information Table 305 to which a request is written is obtained from the CM Request Information Table Pool 310. The CM Request Information Table Pool 310 maintains a list of indices to CM Request Information Table entries that are available (e.g., free, or unused). Requests from an accelerator within the device are written to the NI Request Information Table 315 using the NI Request Information Table Pool 320 for the available entry indices. The two pools—the CM Request Information Table Pool 310 and the NI Request Information Table Pool 320—are configured such that accelerator requests (e.g., internal requests) cannot consume all table entries. Thus, for example, if an additional NI request arrives and there is no free entry indicated in the NI Request Information Table Pool 320, the request is stalled until an entry is available. Here, the request can stay in the in-bound queue until an entry is available.

CXL.mem requests from the CM queue 325 are selected at higher priority than NI requests in the NI queue 330 to ensure forward progress of the CM requests. In an example, as illustrated, when a request is selected from either the CM queue 325 or the NI queue 330, the request information is written into the NI+CM Request Information Table 325. Hereafter, each request is represented in the various queues by an identifier (e.g., index) to an entry of the NI+CM Request Information Table 330. This arrangement can reduce the storage requirements and bandwidth in transferring the request information among the various queues at different processing points in the controller. When an aspect of the request is needed by a processing point, such as an address for a read, the identifier is used to reference the entry in the NI+CM Request Information Table 330 and retrieve the field of the request corresponding to the needed aspect. As with the CM Request Information Table 305 and the NI Request Information Table 315, a free list, or pool, of entries can be used to quickly determine which entries are available to store request information in the NI+CM Request Information Table 330.

When a request is selected, a cache tag 335 for a cache line (e.g., cache way) corresponding to an address in the request is checked to determine whether the requests will be deferred (e.g., processed later). Deferral of the request is generally required when there is no free way line entry in a cache set for the address in the request. If no deferral will occur, the cache data can be read 340 or modified 345 (e.g., for a write), and the way tag can be modified 350. Modifying the tag 350 or the cache data 345 can respectively be written to backing memory, such as in writing the tag data 355 and the cache way data 360.

When the request is deferred, the request entry identifier (e.g., from the NI+CM Request Information Table 330) is pushed to either the CM or NI defer queues 365. The way defer queues 365 are used when there is a way corresponding to the address in the request but the way is busy (e.g., waiting for another command to complete). The set defer queues 365 are used when there is no way that corresponds to the address. The request remains queued until a way is available (e.g., not busy). In an example, there are separate CM and NI defer queues 365 for each cache set within the cache.

The external control queues 370 manage external responses to the cache, such as responses to reads or writes to the backing memory, memory controller (MC) requests, or CXL recalls. A CXL recall is a request by the memory device to regain control of a cache way from the host. The recall is requested of the host and the host communicates the control of the cache way to the memory controller, for example, in CXL meta state. This procedure can be called a bias flip as the control bias for the cache way is flipped from the host to the controller or vice versa. This technique is used to enable cache coherency between any host cache and the memory device.

The command queues 375 track requests through a variety of processing points, such as whether to push or pop requests from defer queues 365, whether a CXL recall is initiated, memory controller requests, executing a command, or executing an atomic memory operation (AMO). The reference to a long AMO is an AMO that cannot complete within a single execution cycle (e.g., a clock cycle). An AMO is a near-memory operation completed by an accelerator of the memory controller.

The illustrated control and data paths are configured such that separate storage, queuing, and request prioritization enables forward progress on CM requests while executing in the presence of NI requests. Thus, CM requests will not be delayed by an NI request.

FIG. 4 illustrates an example of an associative cache 400, according to an embodiment. Here, the associative cache 400 includes four cache sets, cache set zero 405, cache set one 410, cache set two 415, and cache set three 420. Note that each cache set corresponds to a memory address range. Thus, cache set one corresponds to all memory elements with an address prefixed by 00 while cache set three 415 corresponds to all memory elements with an address prefixed by 10. The cache lines within each cache set represent a storage element (e.g., register) sized for an element in the memory. Each cache line can also be called a "way." Thus, as illustrated, the associated cache 400 is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache 400 can maintain metadata for the ways. Thus, as illustrated, the associative cache 400 includes a tag (e.g., metadata) in addition to the way data, resulting in the way zero tag and data 425, the way one tag and data 430, the way two tag and data 435, and the way three tag and data 440. Examples of tag data can include a dirty bit to indicate whether the way is out-of-sync with the backing memory, whether there is an operation to synchronize the way with host memory (e.g., a host recall is underway), or CXL meta-state, request state, among others. In an example, whether the source (e.g., internal, or external) of the request impacts operation of the memory controller, the tag data can include designation of whether the request is internal or external as well as, for example, whether the request is internal and deferred, or external and deferred.

The following is an example of a data structure (e.g., C-style struct) to hold tag data that applies to an entire cache set (e.g., not specific to a single way in the cache set):

```
struct MscSet {
    bool           m_bRetryPend;
    uint32_t       m_evHashMask;
    SimCount       m_evRecallCnt;
    SimMscReqList  m_niDeferList;
    SimMscReqList  m_cmDeferList;
};
```

The following is an example of a data structure (e.g., C-style struct) to hold tag data for a given way in a cache set:

```
struct MscWay {
    struct MscWayTag {
        uint64_t     m_addr;
        std::bitset  m_validMask;
        std::bitset  m_dirtyMask;
        std::bitset  m_mBusyMask;
        bool         m_bRetryPend;
        bool         m_bRecallPend;
        uint16_t     m_recallRid;
        MetaState    m_memMetaState;
        MetaState    m_curMetaState;
        SimMscReqList   m_niDeferList;
        SimMscReqList   m_cmDeferList;
    } m_tag;
    uint8_t[64]     m_data;
};
```

FIG. 5 illustrates an example of a memory 500 including several cache way defer queues and cache tags 525 pointing to the defer queues, according to an embodiment. As illustrated, the memory 500 is used to implement several queues. The queues each occupy a contiguous range of the memory 500, with the specific boundaries of the queue defined by a head a tail pointer. In this example, the queue is implemented as a linked list or a double-linked list. The former enables traversal starting at the head, although enqueueing can be accomplished merely by updating the tail element with a new tail location and placing the new item at the new tail location. A double linked list enables traversal of the list from either the head or the tail.

The queues correspond to a cache way by storage of the head and tail pointers in the tag data. Thus, in the cache set 530, the way zero tag 535 maintains the head and tail pointer for the queue 505 (illustrated as holding request one). The empty entry 510 is part of the contiguous memory range corresponding to the queue 505. Thus, if a second request were enqueue, the tail pointer would be moved to the entry 510. Similarly, the way one tag 540 holds the head and tail pointer for the queue 515, and the way N tag 545 maintains the head and tail pointer for the queue 520.

An alternative configuration of the queue can leverage, if it exists, the request directory entries (e.g., as illustrated in element 330 of FIG. 3). Here, the queue is simply a head pointer into the directory to designate the first request in the queue and a tail pointer into the directory to designate the last request in the queue. The queue, in this example, is a linked-list in which the elements (e.g., directory entries for the requests) point to each other. In a simple implementation, the links are one-way from the head to the tail. Thus, the directory entry for each element in the list links to the next element in the list. To add a new element, the "next element" pointer in the directory entry indicated by the tail pointer is updated to the new entry and the tail pointer is also updated to the new entry. In an example, the linked list can be bi-directional, in which each directory entry has a pointer to a previous element as well as a next element. The queue is traversed by entering the queue using the head pointer, for example, to get to a directory entry. The next element pointer can then be used to get to the next element of the queue. This process can be repeated until the next element pointer is empty, indicating the end of the queue.

FIG. 6 illustrates an example of a cache set reference 600 to cache-set defer queues divided by which interface requests were received, according to an embodiment. Specifically, the external defer queues 630 hold requests, or identifiers of requests, for CM requests and the internal defer queues 645 hold NI requests. FIG. 6 differs from the arrangement illustrated in FIG. 5 by separating the queues between the external queues 630 and the internal queues 645. Thus, the way zero tag data includes a field 610 storing the head and pointer for external queue 635 as well as the field 615 for the head pointer of the internal queue 650.

Another difference from the arrangement illustrated in FIG. 5 includes the inclusion of the field 620 and field 625 in the cache set 605. Here, the field 620 holds a head and tail pointer for an external queue of the cache set 605 and the field 625 holds a head and tail pointer for an internal queue of the cache set 605. As described above, if a way is instantiated for an address in the request, but the way is busy, the request is deferred into the appropriate defer queue for the way. Thus, if the request A is an external request and has an address that corresponds to the current way zero, but way zero is busy, then request A is enqueued into the queue 635 for the way zero. However, if there is no way that corresponds to the address in the request, then the request is deferred at the cache set level. Accordingly, because request M is an internal request with an address that does not match any current way—and all ways are busy—the request M is deferred by being placed on the internal defer queue 655. Similarly, external request N is deferred at the cache set level in queue 640 for similarly reasons given for request M.

Figure 7:
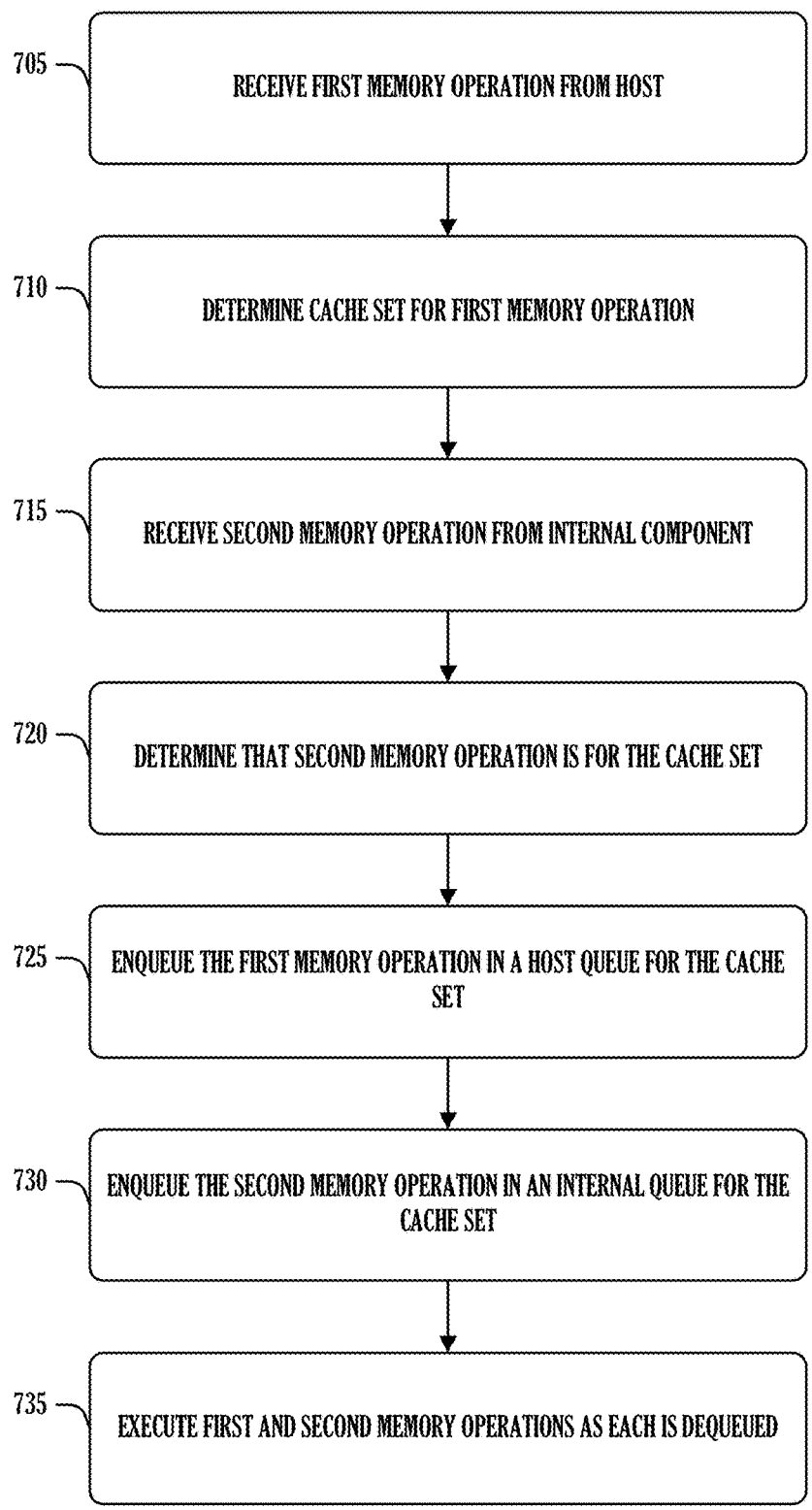
FIG. 7 illustrates a flow diagram of an example of a method for host-preferred memory operation, according to an embodiment.

FIG. 7 illustrates a flow diagram of an example of a method 700 for host-preferred memory operation, according to an embodiment. The operations of the method 700 are performed by computational hardware, such as that described above or below (e.g., processing circuitry).

At operation 705, a first memory operation is received (e.g., at a memory side cache of a memory device) from a host. In an example, the host is connected to the memory device by a Compute Express Link (CXL) interlink. In an example, memory operations from the host to the memory device are CXL memory operations.

At operation 710, a cache set is selected based on a memory address in the first memory operation.

At operation 715, a second memory operation is received from accelerator hardware of the memory device. In an example, the accelerator hardware is atomic operation processing circuitry.

At operation 720, a determination is made that the second memory operation also corresponds to the cache set to which the first memory operation mapped.

At operation 725, the first memory operation is enqueued in a host queue of the cache set. In an example, the host queue is implemented as a linked list in management memory of the memory-side cache. In an example, the management memory is different than backing memory for cache lines of the memory device.

At operation 730, the second memory operation is enqueued in an internal request queue of the cache set. In an example, internal request queue is implemented as a linked list in management memory of the memory-side cache. In an example, the management memory is different than backing memory for cache lines of the memory device.

In an example, both the first memory operation and the second memory operation correspond to a cache line of the cache set. In an example, the host queue and the internal request queue correspond to the cache line. In an example, each cache line of the cache set includes a separate host queue and internal request queue.

In an example, neither the first memory operation nor the second memory operation correspond to a cache line of the cache set. In an example, the host queue and the internal request queue are deferred queues of the cache set. In an example, the cache set has exactly one deferred host queue and exactly one deferred internal request queue that are not associated with a particular cache line of the cache set.

At operation 735, the first memory operation and the second memory operation are executed as each is dequeued.

Figure 8:
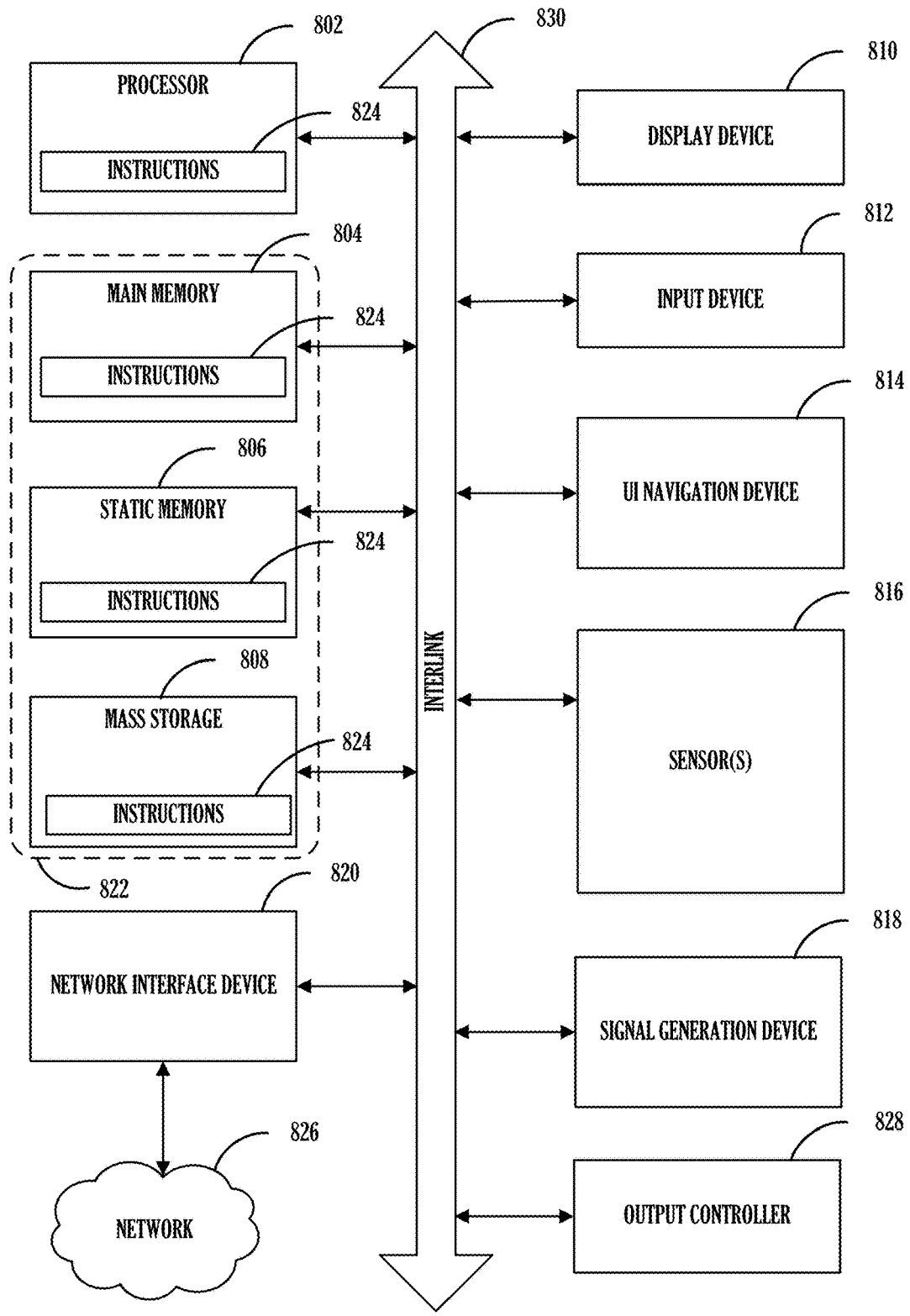
FIG. 8 illustrates an example of a machine with which one or more embodiments can be implemented.

FIG. 8 illustrates a block diagram of an example machine 800 with which any one or more of the techniques (e.g., methodologies) discussed herein can perform. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices) some or all of which can communicate with each other via an interlink (e.g., bus) 830. The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 can be, or include, a machine readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 can constitute the machine readable media 822. While the machine readable medium 822 is illustrated as a single medium, the term "machine readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine readable medium 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine readable medium 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), LoRa/ LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

ADDITIONAL NOTES & EXAMPLES

Example 1 is an apparatus for host-preferred memory operation, the apparatus comprising: an interface to receive a request from a host; an accelerator; and a memory side cache with processing circuitry configured to: receive a first memory operation from a host; determine that the first memory operation, from the host via the interface, that corresponds to a cache set based on an address of the first memory operation; receiving a second memory operation from the accelerator hardware; determine that the second memory operation corresponds to the cache set; enqueue the first memory operation in a host queue of the cache set; enqueue the second memory operation in an internal request queue of the cache set; and execute the first memory operation and the second memory operation as each is dequeued.

In Example 2, the subject matter of Example 1 includes, wherein both the first memory operation and the second memory operation correspond to a cache line of the cache set, and wherein the host queue and the internal request queue correspond to the cache line.

In Example 3, the subject matter of Example 2 includes, wherein each cache line of the cache set includes a separate host queue and internal request queue.

In Example 4, the subject matter of Examples 1-3 includes, wherein neither the first memory operation nor the second memory operation correspond to a cache line of the cache set, and wherein the host queue and the internal request queue are deferred queues of the cache set.

In Example 5, the subject matter of Example 4 includes, wherein the cache set has exactly one deferred host queue and exactly one deferred internal request queue that are not associated with a particular cache line of the cache set.

In Example 6, the subject matter of Examples 1-5 includes, wherein the accelerator hardware is atomic operation processing circuitry.

In Example 7, the subject matter of Examples 1-6 includes, wherein the host is connected to the memory device by a Compute Express Link (CXL) interlink, and wherein memory operations from the host are CXL memory operations.

In Example 8, the subject matter of Examples 1-7 includes, wherein the host queue or the internal request queue are implemented as a linked list in management memory of the memory-side cache, the management memory being different than backing memory for cache lines of the memory device.

Example 9 is a method for host-preferred memory operation, the method comprising: receiving, at a memory-side cache of a memory device that includes, accelerator hardware, a first memory operation from a host; determining that the first memory operation corresponds to a cache set based on an address of the first memory operation; receiving a second memory operation from the accelerator hardware; determining that the second memory operation corresponds to the cache set; enqueuing the first memory operation in a host queue of the cache set; enqueuing the second memory operation in an internal request queue of the cache set; and executing the first memory operation and the second memory operation as each is dequeued.

In Example 10, the subject matter of Example 9 includes, wherein both the first memory operation and the second memory operation correspond to a cache line of the cache set, and wherein the host queue and the internal request queue correspond to the cache line.

In Example 11, the subject matter of Example 10 includes, wherein each cache line of the cache set includes a separate host queue and internal request queue.

In Example 12, the subject matter of Examples 9-11 includes, wherein neither the first memory operation nor the second memory operation correspond to a cache line of the cache set, and wherein the host queue and the internal request queue are deferred queues of the cache set.

In Example 13, the subject matter of Example 12 includes, wherein the cache set has exactly one deferred host queue and exactly one deferred internal request queue that are not associated with a particular cache line of the cache set.

In Example 14, the subject matter of Examples 9-13 includes, wherein the accelerator hardware is atomic operation processing circuitry.

In Example 15, the subject matter of Examples 9-14 includes, wherein the host is connected to the memory device by a Compute Express Link (CXL) interlink, and wherein memory operations from the host are CXL memory operations.

In Example 16, the subject matter of Examples 9-15 includes, wherein the host queue or the internal request queue are implemented as a linked list in management memory of the memory-side cache, the management memory being different than backing memory for cache lines of the memory device.

Example 17 is a machine-readable medium including instructions for host-preferred memory operation, the instructions, when executed by processing circuitry, cause the processing circuitry to perform operations comprising: receiving, at a memory-side cache of a memory device that includes, accelerator hardware, a first memory operation from a host; determining that the first memory operation corresponds to a cache set based on an address of the first memory operation; receiving a second memory operation from the accelerator hardware; determining that the second memory operation corresponds to the cache set; enqueuing the first memory operation in a host queue of the cache set; enqueuing the second memory operation in an internal request queue of the cache set; and executing the first memory operation and the second memory operation as each is dequeued.

In Example 18, the subject matter of Example 17 includes, wherein both the first memory operation and the second memory operation correspond to a cache line of the cache set, and wherein the host queue and the internal request queue correspond to the cache line.

In Example 19, the subject matter of Example 18 includes, wherein each cache line of the cache set includes a separate host queue and internal request queue.

In Example 20, the subject matter of Examples 17-19 includes, wherein neither the first memory operation nor the second memory operation correspond to a cache line of the cache set, and wherein the host queue and the internal request queue are deferred queues of the cache set.

In Example 21, the subject matter of Example 20 includes, wherein the cache set has exactly one deferred host queue and exactly one deferred internal request queue that are not associated with a particular cache line of the cache set.

In Example 22, the subject matter of Examples 17-21 includes, wherein the accelerator hardware is atomic operation processing circuitry.

In Example 23, the subject matter of Examples 17-22 includes, wherein the host is connected to the memory device by a Compute Express Link (CXL) interlink, and wherein memory operations from the host are CXL memory operations.

In Example 24, the subject matter of Examples 17-23 includes, wherein the host queue or the internal request queue are implemented as a linked list in management memory of the memory-side cache, the management memory being different than backing memory for cache lines of the memory device.

Example 25 is a system for host-preferred memory operation, the system comprising: means for receiving, at a memory-side cache of a memory device that includes, accelerator hardware, a first memory operation from a host; means for determining that the first memory operation corresponds to a cache set based on an address of the first memory operation; means for receiving a second memory operation from the accelerator hardware; means for determining that the second memory operation corresponds to the cache set; means for enqueuing the first memory operation in a host queue of the cache set; means for enqueuing the second memory operation in an internal request queue of the cache set; and means for executing the first memory operation and the second memory operation as each is dequeued.

In Example 26, the subject matter of Example 25 includes, wherein both the first memory operation and the second memory operation correspond to a cache line of the cache set, and wherein the host queue and the internal request queue correspond to the cache line.

In Example 27, the subject matter of Example 26 includes, wherein each cache line of the cache set includes a separate host queue and internal request queue.

In Example 28, the subject matter of Examples 25-27 includes, wherein neither the first memory operation nor the second memory operation correspond to a cache line of the cache set, and wherein the host queue and the internal request queue are deferred queues of the cache set.

In Example 29, the subject matter of Example 28 includes, wherein the cache set has exactly one deferred host queue and exactly one deferred internal request queue that are not associated with a particular cache line of the cache set.

In Example 30, the subject matter of Examples 25-29 includes, wherein the accelerator hardware is atomic operation processing circuitry.

In Example 31, the subject matter of Examples 25-30 includes, wherein the host is connected to the memory device by a Compute Express Link (CXL) interlink, and wherein memory operations from the host are CXL memory operations.

In Example 32, the subject matter of Examples 25-31 includes, wherein the host queue or the internal request queue are implemented as a linked list in management memory of the memory-side cache, the management memory being different than backing memory for cache lines of the memory device.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to enable the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A memory system comprising:
   a memory interface to control a memory device;
   an external interface to receive a host request from a host for the memory device;
   a near-memory accelerator to perform on operation an data represented in the memory device;
   an internal interface to receive an internal request from the near-memory accelerator; and
   a memory side cache with processing circuitry configured to:
   maintain a host queue and an internal queue;
   detect that the host request and the internal request both correspond to an element in a cache set of the memory side cache that is unavailable;
   enqueue, based on detecting that the host request and the internal request both correspond to the element in the cache set that is unavailable, the host request in the host queue and the internal request in the internal queue; and
   dequeue, based on the element of the cache set becoming available, the host request from the host queue before dequeuing the internal request from the internal queue for completion of the host request and the internal request.

2. The memory system of claim 1, wherein the external interface conforms to a Compute Express Link (CXL) family of standards.

3. The memory system of claim 2, wherein the host request conforms to the CXL family of standards.

4. The memory system of claim 1, comprising the memory device.

5. The memory system of claim 1, wherein the memory device is external and attached to the memory system.

6. The memory system of claim 1, wherein the memory side cache includes a second memory.

7. The memory system of claim 6, wherein the host queue and the internal queue are implemented as linked lists in the second memory.

8. The memory system of claim 7, wherein the memory side cache includes a third memory to store data for cache lines of the cache set.

9. The memory system of claim 8, wherein tag data for the cache lines are stored in the third memory.

10. The memory system of claim 1, wherein the element of the cache set is in a cache line.

11. The memory system of claim 10, wherein the host queue and the internal queue are assigned to the cache line.

12. The memory system of claim 11, wherein any given cache line of the cache set has exactly one host queue and exactly one internal queue.

13. The memory system of claim 1, wherein the element of the cache set is not in a cache line.

14. The memory system of claim 13, wherein the host queue and the internal queue are deferred queues assigned to the cache set.

15. The memory system of claim 14, wherein the cache set has exactly one deferred host queue and exactly one deferred internal queue.

16. The memory system of claim 1, wherein all requests for the memory device handled by the memory system pass through the memory side cache.

17. The memory system of claim 1, wherein the near-memory accelerator is atomic operation processing circuitry.

18. The memory system of claim 17, wherein the atomic operation processing circuitry implements an atomic operation that corresponds to artificial intelligence inference or training.

19. The memory system of claim 1, wherein the memory side cache is configured to execute requests in order to dequeuing from the host queue and the internal queue.

20. The memory system of claim 1, wherein the memory system is packaged on a first board configured to be plugged into an interface of a second board that includes the host.

* * * * *